United States Patent
Giotto et al.

(10) Patent No.: US 8,385,713 B2
(45) Date of Patent: Feb. 26, 2013

(54) UNIVERSAL OPTICAL FIBER FUSION SPLICE CONNECTOR HOLDER

(75) Inventors: Frank Giotto, New Hartford, NY (US); James C. Inman, Holland Patent, NY (US)

(73) Assignee: Fiber Instruments Sales Inc, Oriskany, NY (US)

( * ) Notice: Subject to any disclaimer, the term of this patent is extended or adjusted under 35 U.S.C. 154(b) by 213 days.

(21) Appl. No.: 13/008,040

(22) Filed: Jan. 18, 2011

(65) Prior Publication Data

US 2011/0243521 A1    Oct. 6, 2011

Related U.S. Application Data

(60) Provisional application No. 61/321,192, filed on Apr. 6, 2010.

(51) Int. Cl.
  *G02B 6/00* (2006.01)
(52) U.S. Cl. ........................................ 385/137; 385/134
(58) Field of Classification Search .................. None
  See application file for complete search history.

(56) References Cited

U.S. PATENT DOCUMENTS

| | | | |
|---|---|---|---|
| 7,192,194 B2 * | 3/2007 | Giotto et al. | 385/53 |
| 7,333,709 B2 * | 2/2008 | Carpenter et al. | 385/136 |
| 7,594,764 B2 | 9/2009 | Palmer et al. | |
| 7,703,990 B1 * | 4/2010 | de Jong et al. | 385/87 |
| 7,901,147 B1 * | 3/2011 | de Jong et al. | 385/95 |
| 2006/0153502 A1 * | 7/2006 | Giotto et al. | 385/53 |
| 2006/0153515 A1 | 7/2006 | Honma et al. | |
| 2008/0181563 A1 | 7/2008 | Akiyama | |
| 2009/0022457 A1 | 1/2009 | de Jong et al. | |
| 2009/0162019 A1 | 6/2009 | Lichoulas et al. | |
| 2009/0238523 A1 | 9/2009 | Honma et al. | |
| 2011/0243521 A1 * | 10/2011 | Giotto et al. | 385/137 |

OTHER PUBLICATIONS

TIA/EIA Standard FOCIS 3 Fiber Optic Connector Intermateability Standard Type SC, Aug. 28, 2000.
TIA/EIA Standard FOCIS 4 Fiber Optic Connector Intermateability Standard Type FC and FC-APC, Sep. 21, 2000.
TIA/EIA Standard FOCIS 10 Fiber Optic Connector Intermateability Standard Type LC, Mar. 6, 2002.

\* cited by examiner

*Primary Examiner* — Rhonda Peace
(74) *Attorney, Agent, or Firm* — Bernhard P. Molldrem, Jr.

(57) ABSTRACT

A universal holder for fusion splice connector bodies fits any of several standard styles of connector body to variety of different fusion splicer machines. The holder is formed of a block of solid material with a longitudinal cutout formed of a series of of generally semiicylindrical recesses and generally cylindrical lands with one or more square cutouts. The recess and lands are coaxially arranged so as to accommodate the various styles of connector bodies. The body also has locating features, including locating cutouts extending up from a bottom side, to accommodate locating structure of an associated fusion splicer machine. These locating cutouts may accommodate pin and slot, offset pin or parallel pin arrangements.

6 Claims, 7 Drawing Sheets

UNIVERSAL OPTICAL FIBER FUSION SPLICE CONNECTOR HOLDER

This non-provisional application claims priority of U.S. Provisional Application Ser. No. 61/321,192, filed Apr. 6, 2010, and the disclosure therein is incorporated by reference.

BACKGROUND OF THE INVENTION

This invention is directed to splice-on connectors for optical fiber communications, and to the technique and equipment of fusion splicing in which a connector, with a short length of optical fiber, or pigtail, is fusion spliced to a terminated length of optical fiber.

Fusion splicing, stated simply, is the melting of two optical fibers and joining them, end-to-end, to create a continuous length of glass fiber. The splice-on connector allows greater flexibility for installers, with a lower insertion loss at the point of junction between the existing fiber from the drop cable and the connector. Fusion splicing is typically carried out in a fusion splicer machine, done in the field or on-site. A number of different styles and shapes of fusion spliced connectors are in common use, i.e., SC, ST, FC, LC and others. In each case, a connector holder is employed to keep the body of the connector in a precise position within the associated fusion splicer machine so that the fiber ends will be precisely aligned for the fusion splice. Current practice requires that for each style or type of connector, there is a different machine and a different holder. This makes it expensive and inconvenient for the fiber installer to match the connector to the customer's needs, and typically requires the installer to possess four or more different models of fusion splicer.

The solution to this would be to provide a holder that fits into a number of the different fusion splicer machines, and which will also accommodate a number of the different types or styles of connector bodies. However, this is not a solution that has previously occurred to anyone in the optical fiber industry, and no universal holder concept or product has been proposed.

OBJECTS AND SUMMARY OF THE INVENTION

Accordingly, it is an object of this invention to provide a universal fiber optic connector holder which will accommodate a variety of different connectors in common use, and which can be used on a variety of styles of fiber optic fusion splice machines.

More particularly, if is an object to provide a universal holder that will solve a problem that exists in the art, and has not previously been addressed.

If is also an object to provide the holder as an inexpensive solution, formed of suitable materials, and being dimensioned to fit precisely and easily into each of a variety of fiber optic fusion splicers, and which easily accommodates any of a variety of connector styles, such as SC, ST, LC and FC.

The present invention involves a FIS Splice-On Connector (SOC) Holder, which is a universal fixture designed to hold standard fully assembled fiber optic connectors in a variety of commercially available fusion splicers for the purpose of low loss field termination of optical fibers.

The holder is designed to be universal in two ways; It is designed to fit into most commercially available fusion splicers with fiber holder capabilities, allowing the user to utilize this new technology without the added costs of purchasing a new fusion splicer; and the single holder is also universal in that it is compatible with (at least) the four most common standard connector styles, SC, ST, FC and LC. This allows the user the flexibility to complete a large range of jobs using equipment they may already own, without requiring individual costly kits for each connector style.

This single universal holder is a low cost, multi-purpose reusable tool, requiring only the purchase of the pre-polished and pre-cleaved connector pigtails.

According to a preferred embodiment, the universal holder for fusion splice connector bodies is adapted for use in a variety of different fusion splicer machines and is embodied as a block of solid material (e.g., a suitable synthetic resin or rigid plastic), the block having a longitudinal, half-cylindrical cutout formed in it. The longitudinal cutout is itself formed of a plurality of generally semi-cylindrical recesses and of generally cylindrical lands or ridges, and may include one or more square (i.e., straight sides and bottom) recesses as well. The recesses and lands are coaxially arranged so as to accommodate a variety of styles of connector bodies. This semi-cylindrical recess also defines a longitudinal axis which matches the axis of the connector and the axis of the fusion splicer. A plurality of locating cutouts extend from the bottom side of the holder body to accommodate locating structure, i.e., locating pins etc., of the associated fusion splicer machine. These locating cutouts are dimensioned to accommodate a variety of styles and manufactures of fusion splicer machines, each of which may have a somewhat different arrangement of locating pins and/or slot(s).

In a preferred embodiment, the locating cutouts include at least first and second locator pin holes, the locator pin holes having respective different dimensions. These two locator pin holes are oval in cross section, with one locator pin hole having its oval shape elongated in the direction parallel to the holder axis and the other having its oval shape elongated in the direction transverse to the axis. This allows the holder to fit styles of splicer machines in which the locator pins are parallel, and machines in which the locator pins are offset.

In addition, the holder body has a proximal neck that projects axially from its proximal end, and a pair of shoulders are formed where the flat front of the holder body meets the neck on either side of the longitudinal cutout. This structure seats within a locating slot on an associated fusion splicer machine, where that type of machine is used. The holder body also has a pair of rounded cutouts located along the axis of said longitudinal cutout and penetrating a bottom side of said block. In the preferred embodiment, one of these is a circular cutout partway between the front and back ends of the holder body, and the second one may be a semicircular cutout at the distal or back end. This allows the holder to fit precisely into locating slot and pin structure on two different types of fusion splicer machines. These structural features do not interfere with one another, and so the holder becomes universal as to four different fusion splicers (at least).

An embodiment of the connector holder of this invention is illustrated in the attached Drawing figures.

DETAILED DESCRIPTION OF THE PREFERRED EMBODIMENT

Figure 1:
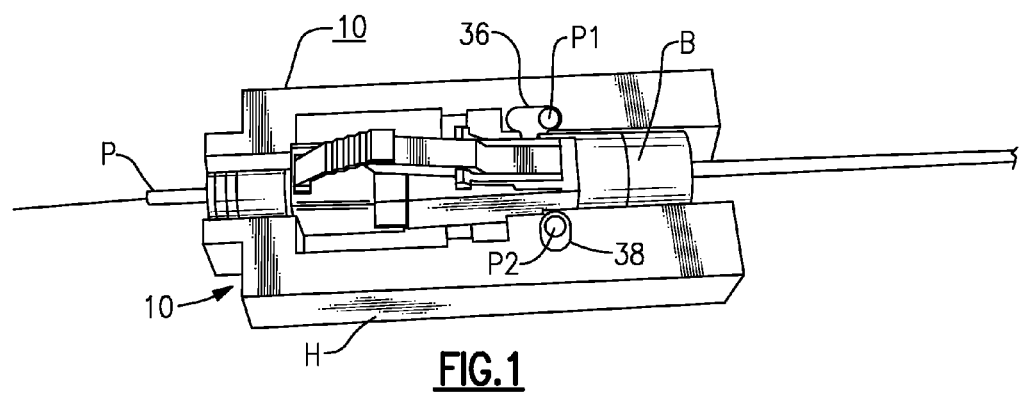
FIG. 1 is a perspective view of the holder of this embodiment, showing the holder with a connector body in place in the shaped, semi-cylindrical recess.

With reference to the Drawing figures, the perspective view of FIG. 1 shows a universal holder H which is fitted onto a fixture of a fusion splicer device, which is not shown here although a pair of locating pins P1 and P2 are shown. In FIG. 1 a connector body B is placed in a generally semi-cylindrical recess in the holder H. A fiber pigtail P is oriented here to the left, and the main, field-fiber cable drop is to the right. Here, the associated fusion splicer machine employs two locator pins P1 and P2 for positioning the holder H and associated connector body B during the fusion splice process.

Figure 4:
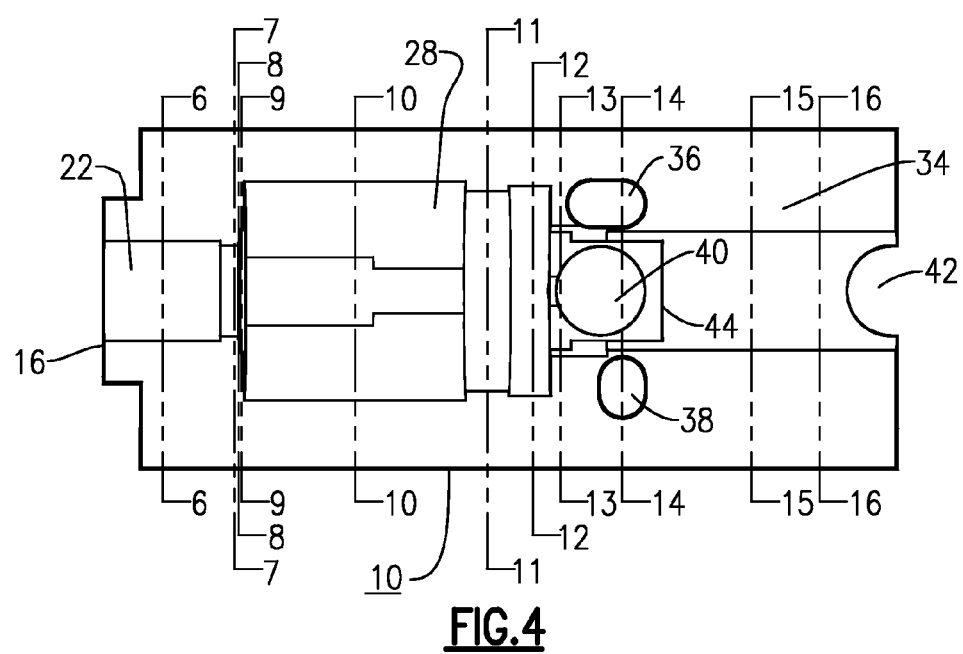
FIG. 4 is a top plan view, shown with section lines 6-6 to 16-16.
Figure 5:
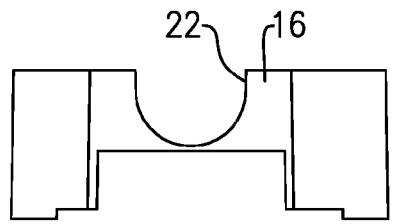
FIG. 5 is a left end view of this embodiment.
Figure 6:
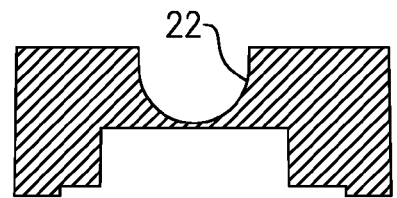
FIGS. 6 to 16 are section views taken across the axis at lines 6-6 to 16-16, respectively.
Figure 7:
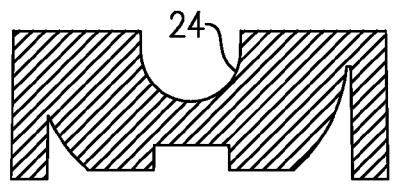
Figure 8:
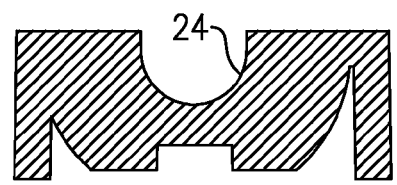
Figure 9:
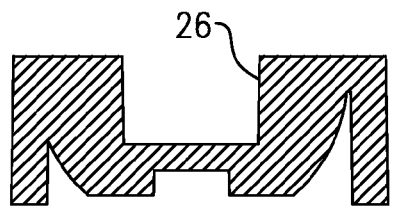
Figure 10:
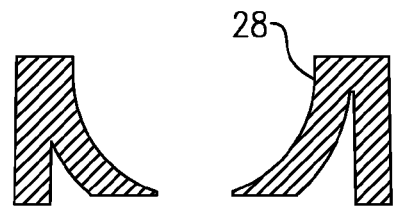
Figure 11:
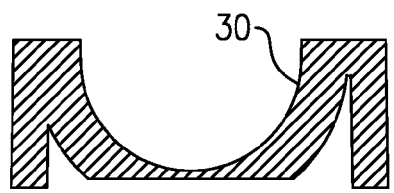
Figure 12:
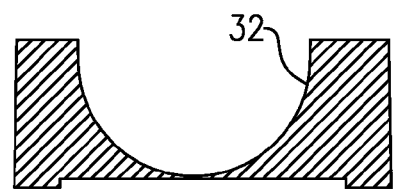
Figure 13:
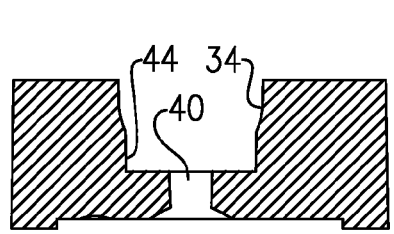
Figure 14:
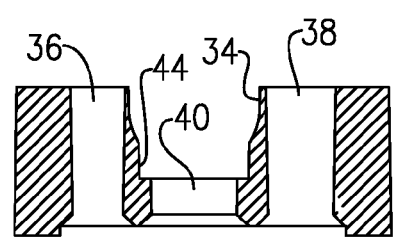
Figure 15:
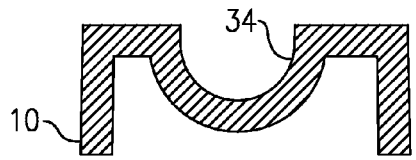
Figure 16:
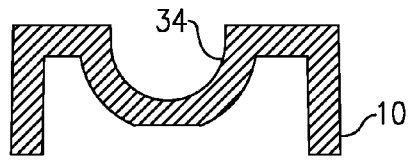
Figure 17:
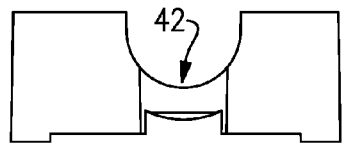
FIG. 17 is a right end view thereof.
Figure 18:
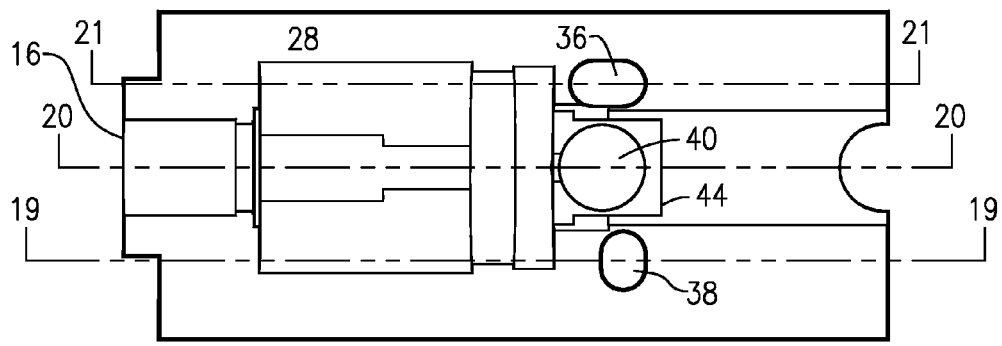
FIG. 18 is a top plan view showing longitudinal section lines 19-19 to 21-21.
Figure 19:
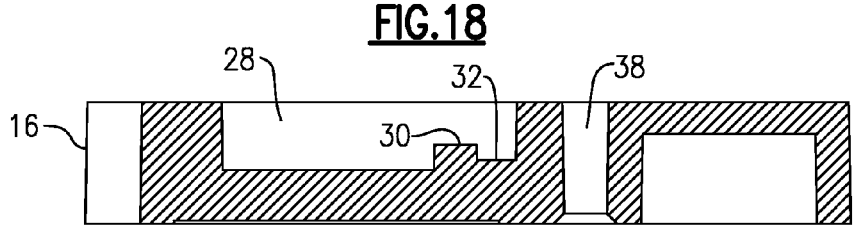
FIGS. 19 to 21 are longitudinal sections taken at 19-19 to 21-21, respectively.
Figure 20:
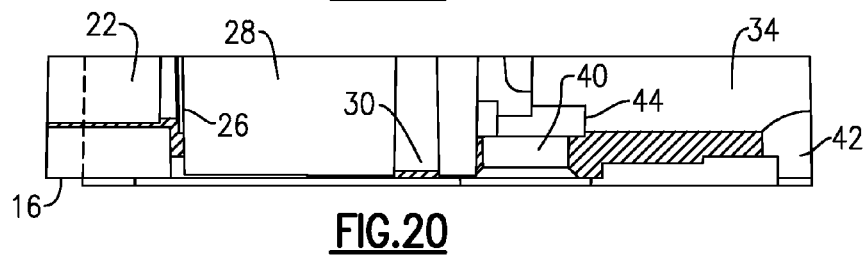
Figure 21:
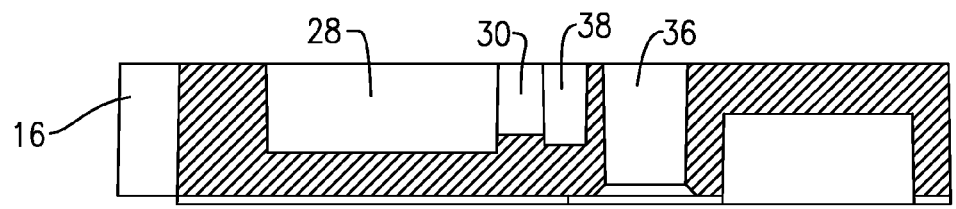
Figure 22:
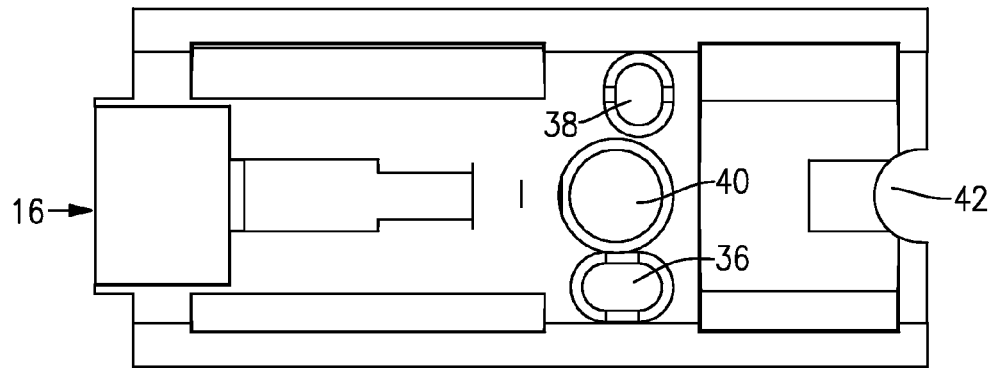
FIG. 22 is a bottom plan view of this embodiment, clearly showing dimensions of the various cutouts including the pin holes and a center aperture.

The universal holder H has first and second locator pin holes 36 and 38, described later, and these are shaped and disposed for accepting locating pins from different types of fusion splicers. The structure of the universal holder is shown in more detail in FIGS. 2 to 22, and in particular in the perspective views of FIGS. 2 and 3, and in the plan views of FIGS. 4, 18 and 22, the end view of FIGS. 5 and 17, and the sections of FIGS. 6 to 16 and FIGS. 19 to 21.

The holder H is in the form of a body 10 or block that is fabricated of a suitable rigid plastic material, i.e., a suitable synthetic resin. If desired, the material may incorporate carbon or another conductive filler as a means to avoid static charge build up.

Figure 2:
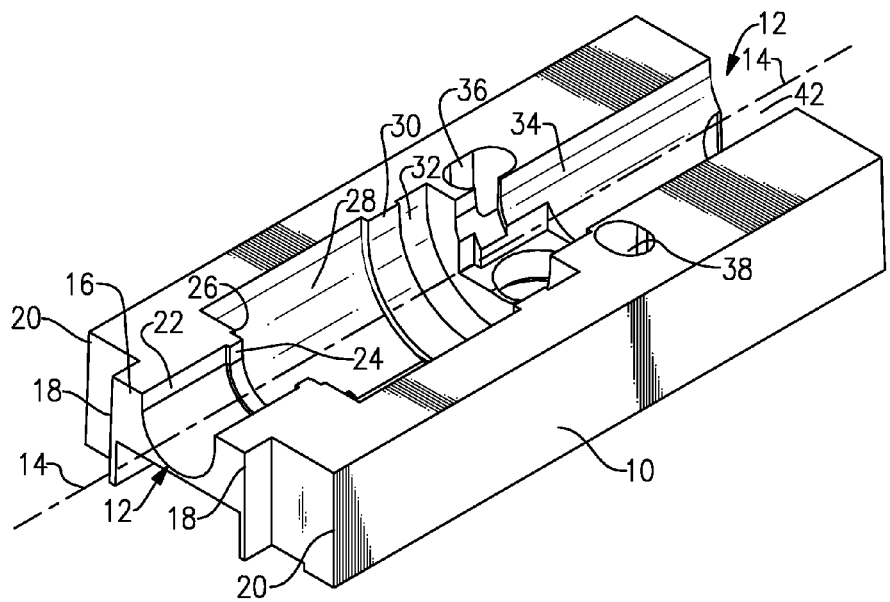
FIG. 2 is a top perspective view of the holder of this embodiment.

The body or block is generally elongated and on its upper side it has a concave, generally semi-cylindrical cutout or void 12 extending proximal-distal, i.e., from left to right in the FIG. 2, centered on a longitudinal axis 14 (shown in broken line). A neck 16 projects from the proximal end of the body 10, with straight generally vertical sides 18 on either side of the cutout 12. These sides 18 meet the flat front of the body to form shoulders 20 that are adapted to interfit with a slot that serves as locating fixture (to be discussed later).

The concave cutout 12 is comprised of a series of generally semi-cylindrical recesses with a number of generally semi-cylindrical ridges or lands, which are arranged so as to seat each of a variety of different connector styles.

A first semi-cylindrical recess 22 commences from the proximal or neck portion, followed by a semi-cylindrical land or ridge 24. Just distal of this, there is a square recess 26 (see FIG. 9) formed in the body 10, with flat vertical sides and a generally flat bottom. After this, a wider-diameter semi-cylindrical recess 28 extends distally until to another semi-cylindrical land 30 followed by a further cylindrical recess 32. This then leads to a smaller-diameter semi-cylindrical tailway 34 that continues out to the distal end of the holder body 10.

At about halfway between the proximal and distal ends are a pair of locator pin holes or apertures 36 and 38 which are situated on opposite sides of the centerline or axis 14. These apertures 36 and 38 have an oval cross section or profile, with the oval cross sections being elongated in different directions. The pin aperture 36 is elongated in the lengthwise or proximal-distal direction (parallel to the axis 14) while the aperture 38 is elongated in the transverse direction (perpendicular to the axis). A first centerline locating pin opening 40 is disposed at the center of the body and approximately between the two apertures 36, 38, while a second centerline locating pin opening 42, here in the shape of a semicircular void, is situated along the axis or centerline at the distal end of the holder body 10. A generally rectangular void 44 is formed beginning at the distal end of the recess 32 and just over the circular centerline locating pin opening 40. The exact dimensions of these recesses, lands, voids, and pin openings would be selected to match the dimensions of the common fiber optic connectors, which are well documented, and to match the locating fixtures of the commonly available fusion splicing equipment.

Figure 3:
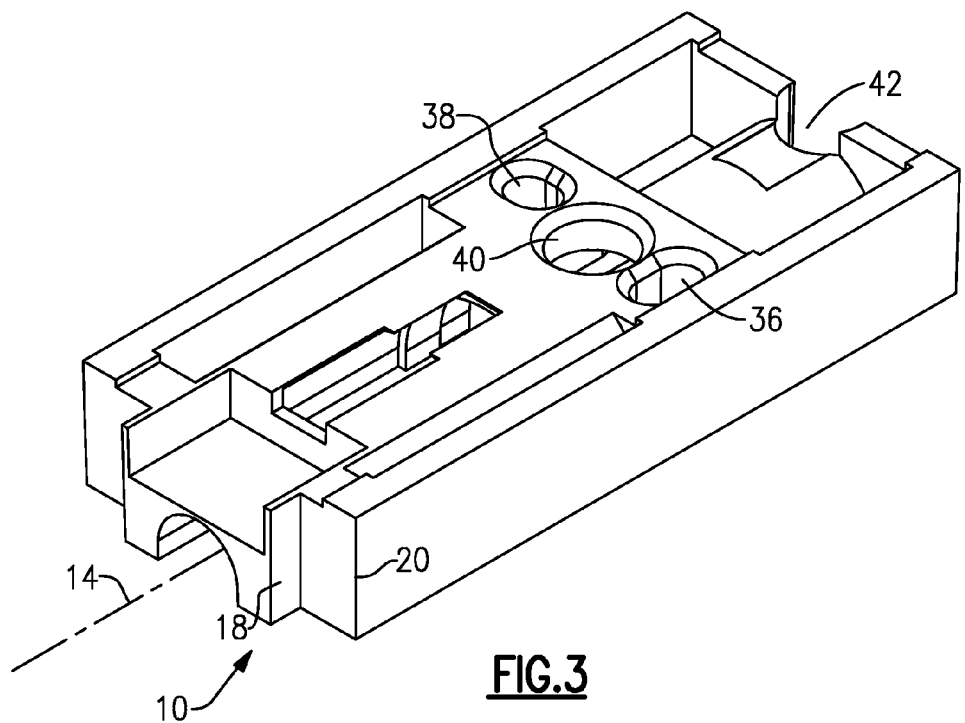
FIG. 3 is a bottom perspective view thereof.

As seen in FIG. 3, the locating pin holes 36, 38, 40 may be chamferred or counter-sunk at their lower ends. Also a gap 46 may be formed along the centerline at the base of the cutout 22. The locating pin holes 36, 38, 40 may be beveled out slightly (i.e., about one degree).

Figure 23:
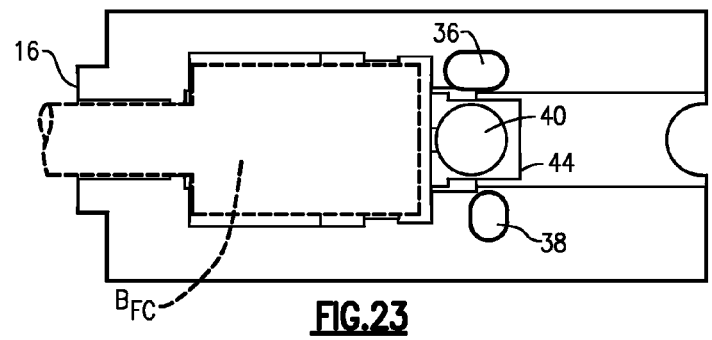
FIGS. 23 to 26 are top plan views for explaining the accommodation of various styles of connector to the universal holder.
Figure 24:
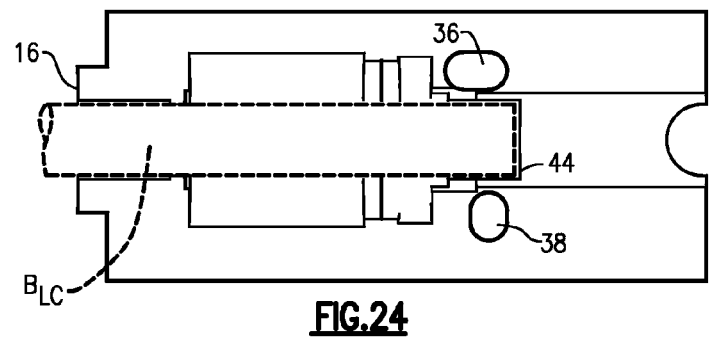
Figure 25:
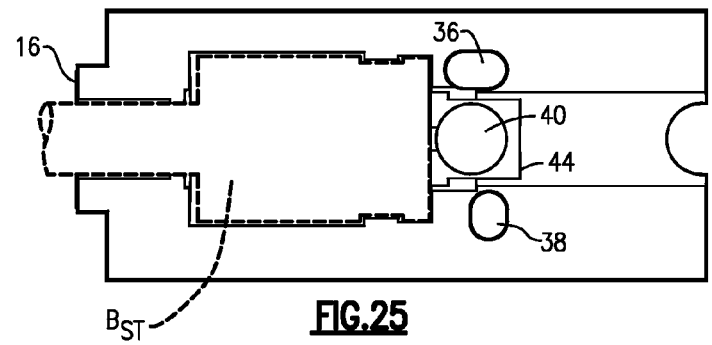
Figure 26:
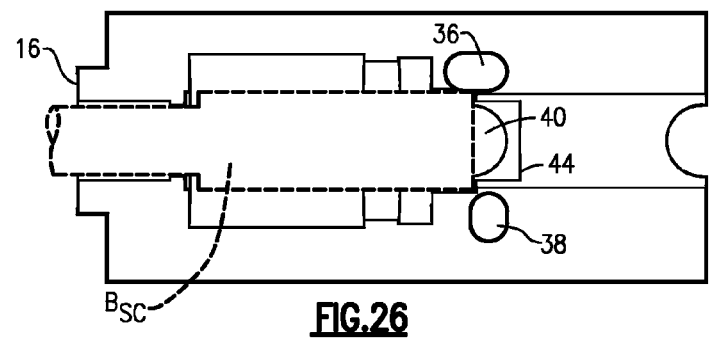

FIGS. 23 to 26 show the general fit of each of the various connector styles in the holder body 10. In each case, the profile or shape of the specific connector is sketched in broad line. FIG. 23 shows an FC style connector body $B_{FC}$. FIG. 24 illustrates an LC connector body $B_{LC}$ in the holder. FIG. 25 shows an ST style connector body $B_{ST}$ in the holder, and FIG. 26 shows an SC style connector body $B_{SC}$ in the universal holder. In each case, particular recesses and voids in the body 10 seat the particular connector body, but do not interfere with the seating of other styles of connector body if those are selected for a particular customer.

FIGS. 27 to 30 sketch the fit of the universal holder body 10 onto a variety of different styles of fusion splicer fixtures.

Figure 27:
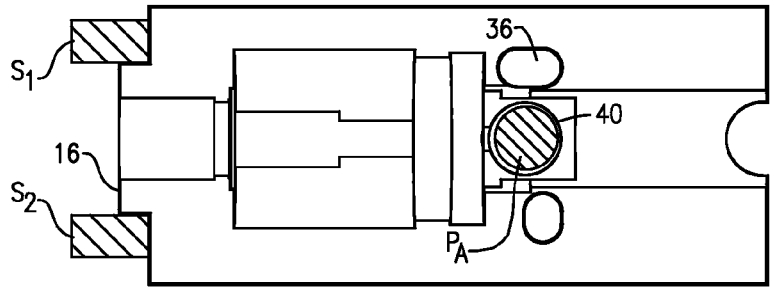
FIGS. 27 to 30 are top plan views for explaining the accommodation of various fusion splicer locator structure to the universal holder.
Figure 28:
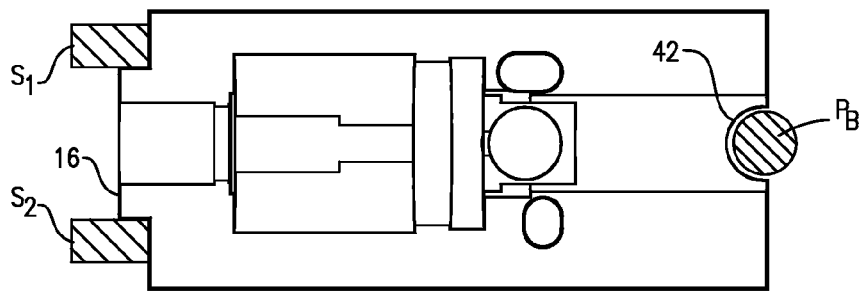

FIG. 27 show the holder body seated into a first pin-slot fixture arrangement, in which the neck 16 and associated shoulders 20 mate with left and right slot fixture elements S1 and S2, and a locating pin PA seats into the first centerline pin aperture 40. FIG. 28 shows a second pin-slot fixture arrangement, which is similar in respect to the slot fixture elements S1 and S2, but with a locating pin PB that seats in the second centerline pin aperture 42.

Figure 29:
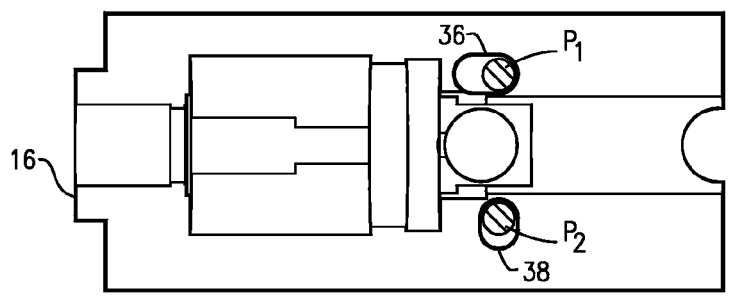
Figure 30:
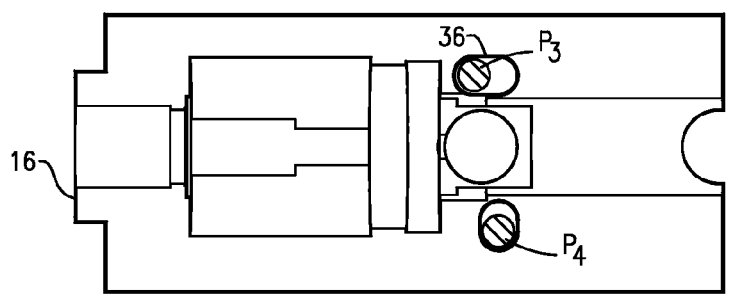

FIG. 29 shows the holder body 10 on a fixture arrangement with parallel pins P1 and P2 that are positioned the same distance along the axis 14 and the same distance on either side of the axis. The pins P1 and P2 locate in the locating pin openings 36 and 38, respectively. FIG. 30 shows the universal holder body 10 with an offset pin fixture arrangement, in which locator pins P3 and P4 are located at different locations along the longitudinal axis and at different spacings on either side of the axis.

While the invention has been described with reference to one embodiment, the invention should not be limited only to that embodiment. Many variations are possible within the scope of invention as defined by the appended claims.

We claim:

1. A universal holder for fusion splice connector bodies and adapted for use in a variety of different fusion splicer machines, comprising a block of solid material having a longitudinal cutout therein, the longitudinal cutout including a plurality of generally semicylindrical recesses and a plurality of generally cylindrical lands therein, the recesses and lands being coaxially arranged so as to accommodate a variety of styles of connector bodies, the semicylindrical recesses also defining a longitudinal axis; and a plurality of locating cutouts extending up from a bottom side to accommodate locating structure of an associated fusion splicer machine, wherein said locating cutouts are dimensioned to accommodate a variety of styles and manufactures of fusion splicer machines; wherein said locating cutouts include at least first and second locator pin holes, the locator pin holes having respective different dimensions, wherein said locator pin holes are oval in cross section, with one locator pin hole being elongated in a direction parallel to said axis and the other being elongated in a direction transverse to said axis; and further comprising a proximal neck projecting axially from a proximal end of said body and defining a pair of shoulders dimensioned to seat within a locating slot on an associated fusion splicer machine; and said locating cutouts including a pair of rounded cutouts located along the axis of said longitudinal cutout and penetrating a bottom side of said block.

2. The universal holder of claim 1 wherein longitudinal cutout includes one or more square recesses having flat sides and a flat bottom.

3. The universal holder of claim 1 wherein the solid material of said block includes a rigid synthetic resin.

4. A universal holder for fusion splice connector bodies and adapted for use in a variety of different fusion splicer machines, comprising a block of solid material having a longitudinal cutout therein, the longitudinal cutout including a plurality of generally semicylindrical recesses and a plurality of generally cylindrical lands therein, the recesses and lands being coaxially arranged so as to accommodate a variety of styles of connector bodies, the semicylindrical recesses also defining a longitudinal axis;

and a plurality of locating cutouts extending up from a bottom side to accommodate locating structure of an associated fusion splicer machine, wherein said locating cutouts are dimensioned to accommodate a variety of styles and manufactures of fusion splicer machines; wherein said locating cutouts include at least first and second locator pin holes, the locator pin holes having respective different dimensions, and wherein said locator pin holes are oval in cross section, with one locator pin hole being elongated in a direction parallel to said axis and the other being elongated in a direction transverse to said axis.

5. The universal holder of claim 4 wherein said locator pin holes are situated on opposite sides of said longitudinal axis.

6. A universal holder for fusion splice connector bodies and adapted for use in a variety of different fusion splicer machines, comprising a block of solid material having a longitudinal cutout therein, the longitudinal cutout including a plurality of generally semicylindrical recesses and a plurality of generally cylindrical lands therein, the recesses and lands being coaxially arranged so as to accommodate a variety of styles of connector bodies, the longitudinal cutout also defining a longitudinal axis; and a plurality of locating cutouts extending up from a bottom side to accommodate locating structure of an associated fusion splicer machine, wherein said locating cutouts are dimensioned to accommodate a variety of styles and manufactures of fusion splicer machines; and comprising a proximal neck projecting axially from a proximal end of said body and defining a pair of shoulders dimensioned to seat within a locating slot on an associated fusion splicer machine; and said locating cutouts including a pair of rounded cutouts located along the axis of said longitudinal cutout and penetrating a bottom side of said block.

\* \* \* \* \*